United States Patent [19]

Murphy

[11] Patent Number: 5,826,367
[45] Date of Patent: Oct. 27, 1998

[54] FISHING LURE, AND A ROD AND FISH HOOK ASSEMBLY THEREFOR

[76] Inventor: John J. Murphy, 705 W. Pine St., Lancaster, Wis. 53813

[21] Appl. No.: 915,241

[22] Filed: Aug. 20, 1997

[51] Int. Cl.⁶ .................................................. A01K 85/00
[52] U.S. Cl. ........................ 43/42.24; 43/42.36; 43/42.39; 43/42.04
[58] Field of Search .................................... 43/15, 34, 35, 43/37, 42.04, 42.05, 42.24, 42.37, 42.38, 42.44, 42.36, 42.39

[56] References Cited

U.S. PATENT DOCUMENTS

| | | |
|---|---|---|
| 1,682,711 | 2/1928 | Pflueger . |
| 2,796,692 | 6/1957 | Harley .................................. 43/42.04 |
| 4,167,076 | 9/1979 | Weaver ................................... 43/42.2 |
| 5,142,811 | 9/1992 | Freeman ................................ 43/42.53 |
| 5,152,094 | 10/1992 | Strickland ............................ 43/42.24 |
| 5,335,441 | 8/1994 | Blackwell ............................. 43/42.36 |
| 5,490,345 | 2/1996 | Infinger ................................ 43/42.39 |

*Primary Examiner*—Jack W. Lavinder
*Attorney, Agent, or Firm*—Bernard J. Murphy

[57] ABSTRACT

A plastic, pliantly limber grub, which comprises the body of the lure has a fish hook and a separate rod set therewithin, and terminations of the hook and the rod have tethering, filamentary material commonly coupled thereto. The coupled terminations are disposed a given distance therebetween, whereas the filamentary material has a free length which is greater than said given distance; this provides for a lost-motion effect, between the body of the lure and its rod, on the one hand, and the fish hook on the other, pursuant to a fish strike on the hook.

8 Claims, 1 Drawing Sheet

FISHING LURE, AND A ROD AND FISH HOOK ASSEMBLY THEREFOR

This invention pertains to fishing lures, and in particular to an improved fishing lure in which, upon the hook of the lure experiencing a fish strike, the body of the lure and the hook exhibit a relative lost motion therebetween. Commonly, lost motion is defined as the difference between the motion of a driver and that of a follower, due to yielding or looseness. Lost motion is the principle which is employed in the instant invention, as well as a universal tethering of the fish hook, to produce the improved fishing lure. This invention defines an alternative embodiment of the Lost-Motion Fishing Lure set forth in my co-pending U.S. patent application Ser. No. 08/748,058, filed on 13 Nov. 1996.

In my co-pending patent application, the novel lure comprehends a fishing lure body formed of relatively rigid material, having trailing means which releasably tethers the hook. Now, in sport fishing, there are grubs, namely plastic, and pliantly limber elements which constitute the body of the lure, which may simulate crayfish, or salamanders, or whatever, and measure three or four or five inches in length. Commonly, fishermen purchase bundles of these grubs, and jigheads for placing the jighead hooks in the grubs. The jigheads may have a weight at one end of a hook shank with an eye extending from the weight. The fishermen scrunch up the grubs, and thread the barbed end of the hook thereinto, for (a) projection of the barbed hook from the body of the grubs, and (b) the confinement of the shank of the hook within the lure body, albeit with the weight and eye exposed at the leading end of the grub for attachment of fishing line. Such constructed fishing lures have a common motion operation of the lure body and hook. It is an object of this invention to set forth a lost motion facility for such grubs, similar to that defined in my aforesaid co-pending patent application.

Particularly, it is an object of this invention to set forth a fishing lure comprising a body; wherein said body has a leading end, and a trailing end; a rod having (a) a first portion confined within said body, and (b) a second portion projecting, outwardly, from said leading end; said first portion has a termination intermediate said leading and trailing ends; a fish hook having a shank and a barbed end; wherein said shank is confined within said body, and has a termination disposed intermediate said leading end, and said termination of said first portion of said rod; and filamentary material intercoupling said terminations.

In addition, it is an object of this invention to disclose a rod and fish hook assembly, for use in combination with a fishing lure body, comprising a rod having a termination; and a fish hook having a shank and a barbed end; wherein said shank has a termination; said terminations comprise means for the attachment of filamentary material thereto; and filamentary material intercoupling said terminations.

Further objects of this invention, as well as the novel features thereof, will become apparent, by reference to the following description, taken in conjunction with the accompanying figures, in which.

Figure 1:
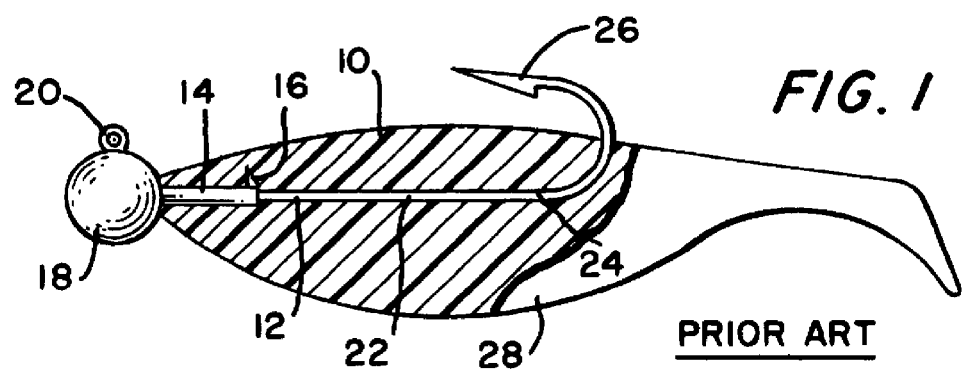
FIG. 1 is an illustration, mostly cross-sectioned axially thereof, of a grub having a jighead fixed therein, the jighead having a weight and fishing line-attachment eye joined thereto, according to what is well known in the prior art.

As shown in FIG. 1, a plastic, pliant, limber grub 10, cross-sectioned along most of the longitudinal axis thereof, has a jighead 12 set therein. The jighead 12 comprises a rod 14 having a perpendicular anchoring tip 16, a weight 18 and an eye 20 joined thereto. The rod is integral with the shank 22 of a fish hook 24, and the barbed end 26 of the hook 24 projects from the body 28 of the grub. The weight 18, of course, is disposed at the leading end of the body 28, and the eye 20 provides for the attachment thereto of fishing line. Upon a fish striking the hook 24 and grub 10, self-evidently, the hook and grub remain substantially unitized, and both hook 24 and grub body 28 travel in a common motion in a same direction.

Figure 2:
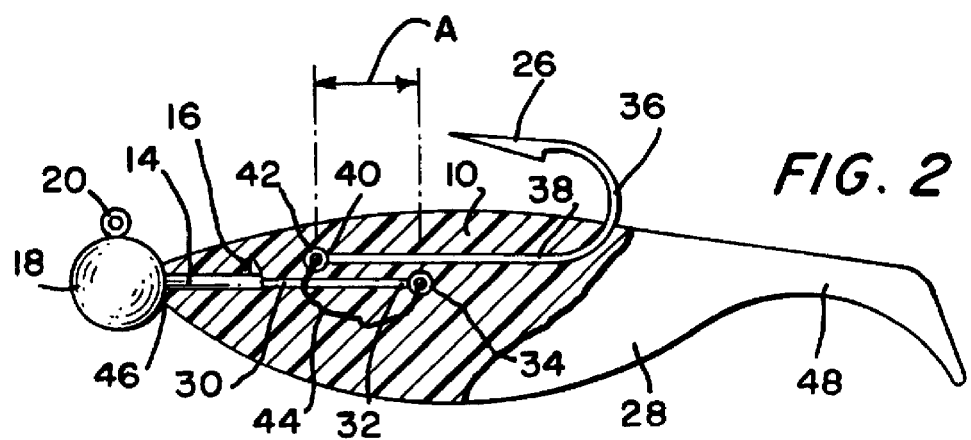
FIG. 2 is an illustration, similar to that of FIG. 1, albeit showing an embodiment of the instant invention, in which the hook is at repose awaiting a fish strike.

FIG. 2 depicts an embodiment of the invention, the same comprising a same grub 10, and rod 14, weight 18 and eye 20, the rod 14 having a same anchoring tip 16. However, herein the rod 14 is integral with a limb 30 which has a termination 32 with an eye 34 formed thereon. Further, a separate hook 36 is employed in the novel lure, the hook 36 having a shank 38 with a termination 40 with another eye 42 formed thereon.

Figure 3:
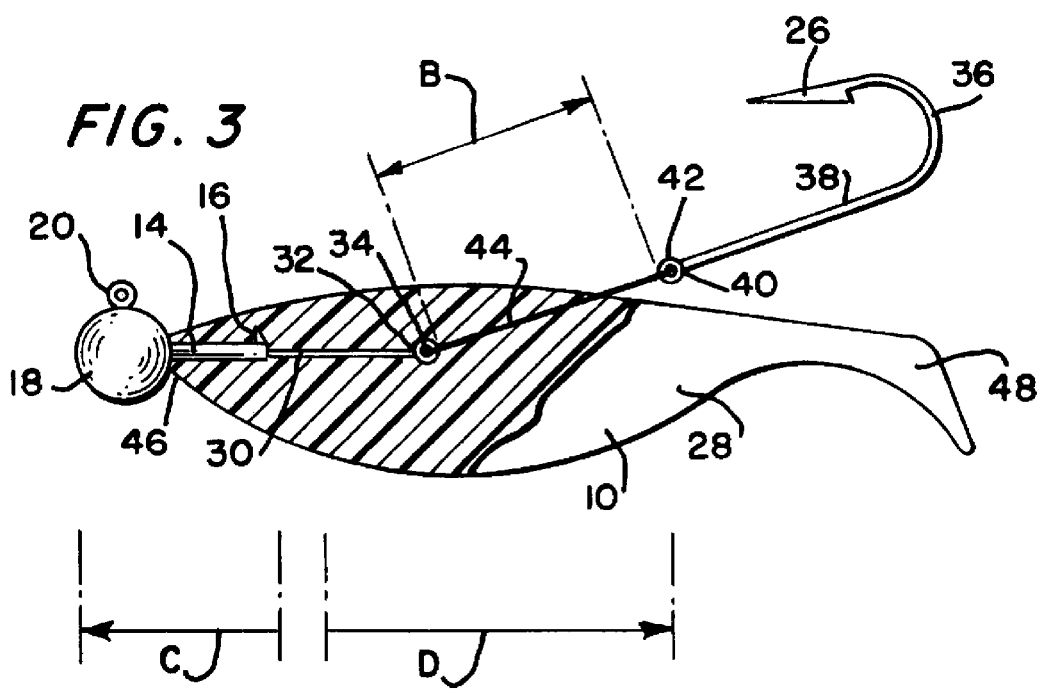
FIG. 3 is the same embodiment of FIG. 2 in which, now, the hook is shown, as if snared by a fish, exited from the body of the grub and universally tethered to the lure body-held rod.

As with the prior art lure of FIG. 1, the body 28 is scrunched up and the hook 36 is threaded thereinto, however before setting the hook 36 in the body 28, length of fishing line, or similar durable and strong filamentary material 44, is fastened to the eye 42. The hook 36 is inserted in the body, albeit with the filamentary material 44 extending from the leading end 46 of the body, through which the hook was inserted. Now, a chosen length of the filamentary material 44 is also fastened to eye 34 of the limb 30, and the eye 34, limb 30, and rod 14 are set into the grub body 28. The predetermined dimensions are such that the termination 32, with its eye 34, is positioned intermediate the leading end 46 of the body and the trailing end 48 thereof, whereas the termination 40, of the hook shank 38, and its eye 42, disposes intermediate the leading end 46 of the body 28 and the termination 32 of the limb 30. As a consequence, the filamentary material 44 is relaxed and freely flexed. The filamentary material 44 is shown, in FIG. 2, in a given area and with a given attitude; this is arbitrary, as the relaxed filamentary material 44 will repose in some indeterminate positioning, until the hook is taken by a fish. Until a fish takes the hook 36, the terminations 32 and 40 are separated by a measure "A", as shown in FIG. 2. As shown in FIG. 3, the filamentary material 44 has a free length "B"which is significantly greater than the aforesaid measure "A".

FIG. 3, of course, shows the circumstance in which the hook 36 has been taken by a fish, and has extracted the hook 36 from the body 28 of the grub. With respect to FIG. 2, for instance, the leading end weight 18 of body 28 traveled a distance "C"in the leftward direction, while the filamentary material-tethered eye 42 of the hook 36 has traveled a distance "D"in the rightward direction. Accordingly, the body 28 and the hook 36 exhibit a lost motion therebetween, and the hook 36 comes free of the body 28, being freely tethered to the eye 34 of the limb 30.

In my co-pending patent application No. 08/748,058, the hook is held, aft or rearward of the lure body, by an elastomeric means, until snared by a fish. In the instant invention, the hook is held by the very lure body itself, in that the body 28, for being of a grasping, seizing nature, grips the hook shank 38 securely until the barbed end 26 is taken by a fish. As priorly explained, the hook 36, is pulled rearwardly, a distance "D"while the body 28 of the lure 10 is being reeled or trolled forwardly a distance "C", to exhibit the lost-motion between the hook 36 and lure body 28. The filamentary material 44 becomes linear, and upon reaching its full, free length "B", brings the hook 36 to a sudden halt. With this, then, the hook 36 sets deeply into the fish, and both hook and fish, at this time, move in common with the lure body 28.

FIGS. 2 and 3 depict the novel fishing lure. More, however, the invention comprehends a rod and fish hook assembly which, independently, is usable with the well-known grubs to form the inventive lure.

The rod and fish hook assembly, with which one can retrofit a simple grub, comprises a rod, such as rod 14 with the limb 30, which has a termination 32, and a fish hook 36 having a shank 38 and a barbed end 26, wherein the shank 38 has a termination 40 and the terminations 32 and 40 comprise means, namely eyes 34 and 42, for the attachment of filamentary material 44 thereto, with such filamentary material intercoupling the terminations 32 and 40 via the eyes 34 and 42.

While I have described my invention in connection with specific embodiments thereof, it is to be clearly understood that this is done only by way of example, and not as a limitation to the scope of my invention, as set forth in the objects thereof, and in the appended claims.

I claim:

1. A fishing lure, comprising:

a body; wherein said body has a leading end, and a trailing end;

a rod having (a) a first portion confined within said body, and (b) a second portion projecting, outwardly, from said leading end;

said first portion has a termination intermediate said leading and trailing ends;

a fish hook having a shank and a barbed end; wherein said shank is confined within said body, and has a termination disposed intermediate said leading end, and said termination of said first portion of said rod; and filamentary material intercoupling said terminations.

2. A fishing lure, according to claim 1, wherein:

said second portion comprises means for an attachment thereto of fishing line.

3. A fishing lure, according to claim 1, wherein:

said terminations are separated therebetween by a given dimension; and said filamentary material has a free length which is greater than said given dimension.

4. A fishing lure, according to claim 1, wherein:

said terminations comprise means for the attachment of said filamentary material thereto.

5. A fishing lure, according to claim 4, wherein:

said attachment means comprises eyes.

6. A fishing lure, comprising:

a body; wherein said body has a leading end, and a trailing end;

a rod having (a) a first portion cofined within said body, and (b) a second portion projecting, outwardly, from said leading end;

first portion has a termination intermediate said leading and trailing ends;

a fish hook having a shank and a barbed end; wherein said shank is confined within said body, and has a termination disposed intermediate said leading end and said termination of said first portion of said rod; and means for tethering said hook to said rod.

7. A fishing lure, according to claim 6, wherein:

said terminations comprise means for an attachment of filamentary material thereto; and said tethering means comprises filamentary material intercoupling said terminations.

8. A fishing lure, according to claim 7, wherein:

said terminations are spaced apart by a prescribed dimension; and said filamentary material has a free length which is greater than said prescribed dimension.

* * * * *